3,423,509
MALARIA THERAPY WITH 2,4,7-TRIAMINOPTERIDINE

Thomas S. Osdene, Richmond, Va., Leo Rane, Miami, Fla., and Peter B. Russell, Villanova, Pa.; said Leo Rane assignor to the United States of America as represented by the Secretary of the Army, and said Thomas S. Osdene and said Peter B. Russell assignors to American Home Products Corporation, New York, N.Y., a corporation of Delaware
No Drawing. Continuation of application Ser. No. 467,134, June 25, 1965. This application Apr. 7, 1967, Ser. No. 629,077
U.S. Cl. 424—251
Int. Cl. A61k 27/00
2 Claims

ABSTRACT OF THE DISCLOSURE 2,4,7-triaminopteridines having an ortho-substituted phenyl group at the 6-position are used in a process for treating malaria.

---

This application is a continuation of U.S. application S.N. 467,134 filed June 25, 1965, now abandoned.

This invention relates to compositions of matter classified in the art of chemistry as substituted pteridines and to a process for using such compositions for malaria therapy.

The invention sought to be patented in its process aspect is described as residing in the concept of using the tangible embodiment of a composition of matter having a molecular structure in which there is attached to a 2,4,7-triaminopteridine nucleus an ortho-substituted phenyl group at the 6-position, by administering to a human being such composition as the essential active ingredient of a pharmaceutical formulation for the application of malaria therapy.

The tangible embodiments of the compositions used in the process of the invention possess the inherent general physical properties of being high melting point, yellowish crystalline solids; are insoluble in water; and are soluble in mineral acids forming the corresponding mineral acid salts. Examination of the compounds produced by the hereinafter described procedures reveals, upon ultraviolet spectrographic analysis, spectral data confirming the molecular structure hereinbefore set forth. For example, substitution at the ortho position of the 6-phenyl group is confirmed by a hypsochromic shift of the phenyl frequency in the ultraviolet. The aformentioned physical characteristics, taken together with the nature of the starting materials and the mode of synthesis, positively confirm the structure of the compositions used in the process sought to be patented.

The manner of making and the process of using the invention will now be generally described so as to enable a person skilled in the art of chemistry to make and use a specific embodiment of the same as follows:

The preparation of the 2,4,7-triamino-6-ortho-substituted phenylpteridines used in our invention is described in the literature. Generally they are prepared by reacting 5-nitroso-2,4,6-triaminopyrimidine and the appropriately substituted phenyl-acetonitrile with sodium in a suitable alcohol solvent such as 2-ethovyethanol or alternately with an anhydrous sodium compound such as sodium ethoxide or sodium methoxide in a suitable solvent, such as dimethylformamide, and the like. The mixture is heated at reflux with stirring for about four hours and then allowed to cool. On removal of the solvent and trituration with water, a brown precipitate forms, or an oil is obtained which solidifies on standing. The brown solid is then recrystallized to obtain the desired pteridine in pure state.

The 5-nitroso-2,4,6-triaminopyrimidine and the phenyl-acetonitriles employed as starting materials in preparing the compounds used in the processes of our invention are also generally known or are readily prepared by procedures known to those skilled in the art.

It is well known that 2,4,7-triamino-6-phenylpteridines have diuretic and hypotensive activity. See for example U.S. Patent No. 3,081,230 which disclosed compositions for, and a method of producing diuretic and hypotensive activity. Quite unexpectedly, however, we have discovered that a certain subgroup of 2,4,7-triamino-6-phenylpteridines, namely those in which the 6-phenyl group is substituted with a group other than hydrogen in at least one ortho position have anti-malarial activity and are useful in the therapy of malaria.

Malaria is perhaps one of the most widespread of all human diseases; it has been estimated that some 300 million people are afflicted, and about 2–3 million die of the disease each year. Furthermore, contrary to popular belief, malaria is not confined to the tropical and subtropical regional; outbreaks have occurred almost as far north as the Artic Circle and to a corresponding latitude south. It is a protozoan disease cased by four species of the genus Plasmodium which forms one of the families of the suborder Haemosporidia. The genus Plasmodium is defined to include pigment-producing parasites that undergo one cycle of asexual division in the reticulo-endothelial tissues and circulating red blood cells of the vertebrate host and which undergo sporogony (sexual division) in the females of the anopheline species of the mosquito. In man, the benign tertian form of malaria is caused by *Plasmodium vivax*; this parasite has an erythrocytic phase of reproduction requiring 48 hours, and thus an attack of chills and fever recurs each second day. There are many different strains of vivax parasites; some cause malaria characterized by repeated relapses. The malignant, subtertian or estivo-autumnal form of malaria is caused by *Plasmodium falciparum* which requires 24 to 48 hours for reproduction. Paroxysms of chills and fever may occur every 24 hours or at irregular intervals. The acute clinical attach is often fulminating in character and may be rapidly fatal. The quartian form of malaria is caused by *Plasmodium malariae* which has a cycle of 48 hours and resembles vivax malaria in its clinical manifestations. Mixed forms can occur as a result of infection with more than one species of malarial parasite.

The treatment of malaria may be of two types: (1) clinical cure, in which symptomatic relief is attained without eradication of the infection. Drugs in this category interrupt erythrocytic schizogony of the malaria parasite and in this manner terminate the clinical attack; (2) radical cure, in which symptomatic relief and complete eradication of the erythrocytic as well as the exoerythrocytic parasites of an established infection is attained. Suppressive therapy which inhibits the erythrocytic stage of development of the parasite may be either: (1) prophylactic, in which the infected individual is kept free of clinical manifestations of the disease but without eradication of the infection; or (2) curative, in which malaria does not appear following cessation of the drug. The latter is also designated as causal prophylaxis. Infection is not prevented by a suppressive drug, the exoerythrocytic stage persists, and clinical attacks may occur at varying intervals after suppressive medication is stopped, particularly in certain types of vivax malaria. In contrast, most faliciparum infections may be cured by the administration of a suppressive drug administration being continued only if there is a possibility of reinfection.

That the 2,4,7 - triamino - 6 - ortho-substituted-phenylpteridines are useful for the treatment of malaria is indeed surprising in view of the differences in the nature and causitive agent of hypertension and malaria, and totally unpredictable from the prior art medicinal uses.

THE TESTING OF ANTIMALARIAL DRUGS

In the experiment evaluation of new drugs for the treatment of malaria, duckling infected with *Plasmodium lophurae*, chicks with *Plasmodium gallinaceum* or mice infected with *Plasmodium berghei* are utilized. Although both the host and strain of malaria are different from those encountered in the human, screening tests utilizing either avian or mouse malaria have led to the development of the new antimalarial drugs now available, such as, for example, quinacrine, chloroquine, pamaquine, proguanil, etc.

*Plasmodium berghei* has been utilized in certain laboratories for screening potential antimalarial compounds. In general, *P. berghei* infections show the same range of susceptibility to a variety of known antimalarial drugs as other malaria parasites used for evaluating potential drugs. See for example Bull. soc. pathol. exotique, 42, 449 (1949); Ann. Trop. Med. Parasitol., 44, 291 (1950); Brit. J. Pharmacol., 5, 409 (1950); Ibid, 8, 162 (1953); Z. Tropenmed. u. Parasitol., 2, 471 (1951).

SCREENING METHOD EMPLOYED

Utilizing young ICR/Ha Swiss mice and a standard inoculum of *Plasmodium berghei*, it is possible to produce a uniform disease fatal to 100% of untreated animals within 6 to 8 days. The mean survival time of more than 2,000 consecutive controls was 7.1 (SD±0.49), and the mean survival time of 48 consecutive control groups (averaging 28 animals per group) varied from 6.1 to 8.0 days.

SPECIFIC METHOD

Animal hosts.—Non-inbred ICR/Ha Swiss mice are used in screening. Test animals weigh from 18 to 22 grams but the weight variations in any given experimental or control group are confined to 2–3 grams. All animals in any given test are approximately of the same age. Animals on test are housed in metal-topped plastic cages, given a standard laboratory diet and water ad lib.

Test procedure.—Test animals receive an intraperitoneal injection of 0.5 ml. of a 1:100 dilution of heparinized heart's blood with a minimum of 90% parasitized cells drawn from donor mice infected one week earlier with *Plasmodium berghei*. The donor strain is maintained by weekly passages in separate groups of mice inoculated with a 0.5 ml. of 1:500 dilution of heparinized heart's blood.

Drug administration.—Test compounds are usually administered after solution or suspension in sesame or peanut oil. A single dose is given subcutaneously 72 hours after the mice are infected with *Plasmodium berghei*. At this time a 10–15 percent parasitemia has developed; the disease is well established but has not produced sufficient debility to alter the response of the host to toxic effects of the drug on test. Since treatment is withheld for three days to permit the infection to become well established and death occurs in untreated controls within 6–8 days, this system presents a candidate compound with the maximum challenge.

Treated animals are kept under observation for 60 days. Survivors at the end of this period of time are considered as cured.

In order to check factors such as changes in the infectivity of *Plasmodium berghei* or in the susceptibility of the host or to detect technical errors, a group of infected animals treated with pyrimethamine at dose levels producing definite increases in survival time is included as a positive control in every experiment.

In each experiment test compounds are administered in graded dosages. With highly active compounds, increases in dose levels are usually followed by increases in the survival time of the treated mice. However, if an active drug is toxic for the host, its toxicity may become a limiting factor; continued increases in dose levels also increase the toxic effects and may result in the diminution of survival times. Deaths prior to the sixth day, when untreated controls begin to die, are regarded as nonparasitic and become the basis for toxicity evaluations.

The best mode contemplated by the inventors of carrying out their invention will now be set forth as follows:

Example 1.—2,4,7-triamino-6-(o-tolyl)pteridine

The manner of preparing this compound used in the process of our invention will now be described:

To a solution of 27.6 g. of sodium in 5 l. of dry 2-ethoxyethanol add 184.8 g. of 2,4,6-triamino - 5 - nitrosopyrimidine and 172.9 g. of o-tolyl-acetonitrile. Stir the mixture and heat to boiling under reflux for 5 hours. A precipitate deposits from the solution. Remove the solids by filtration, wash them with hot water and recrystallize from aqueous dimethylformamide to obtain 2,4,7 - triamino-6-(o-tolyl)pteridine, M.P. 343°.

*Analysis*.—Calcd.: C=58.41, H=4.90, N=36.69. Found: C=58.11, H=4.97, N=36.70.

ANTIMALARIAL DRUG EVALUATION RESULTS
[Chemical Name—2,4,7-triamino-6-(o-tolyl)-pteridine]

| Test No.: | Dose mg./kg. | Mean Survival Time (days) T/C | Change in MST (days) | Toxic Deaths Drug |
|---|---|---|---|---|
| I | 1,280 | >60/7.5 | 5/5 Cures | 0/5 |
|   | 640 | >60/7.5 | ...do... | 0/5 |
|   | 320 | >60/7.5 | 2/5 Cures | 0/5 |
|   | 160 | 27.6/7.5 | +20.1 | 0/5 |
|   | 80 | 24.2/7.5 | +16.7 | 0/5 |
|   | 40 | 17.8/7.5 | +10.3 | 0/5 |
|   | 20 | 12.6/7.5 | +5.1 | 0/5 |
|   | 10 | 9.2/7.5 | +1.7 | 0/5 |
| II | 1,280 | >60/7.2 | 5/5 Cures | 0/5 |
|   | 640 | >60/7.2 | ...do... | 0/5 |
|   | 320 | >60/7.2 | 2/5 Cures | 0/5 |
|   | 160 | 26.8/7.2 | +19.6 | 0/5 |
|   | 80 | 23.0/7.2 | +15.8 | 0/5 |
|   | 40 | 17.0/7.2 | +9.8 | 0/5 |
|   | 20 | 12.2/7.2 | +5.0 | 0/5 |
|   | 10 | 9.0/7.2 | +1.8 | 0/5 |
| III | 1,280 | >60/7.1 | 5/5 Cures | 0/5 |
|   | 640 | >60/7.1 | ...do... | 0/5 |
|   | 320 | >60/7.1 | 2/5 Cures | 0/5 |
|   | 160 | 25.4/7.1 | +18.3 | 0/5 |
|   | 80 | 22.2/7.1 | +15.1 | 0/5 |
|   | 40 | 16.5/7.1 | +9.4 | 0/5 |
|   | 20 | 12.6/7.1 | +5.5 | 0/5 |
|   | 10 | 8.0/7.1 | +9.0 | 0/5 |
| IV | 1,280 | >60/6.9 | 10/10 Cures | 0/10 |
|   | 640 | >60/6.9 | ...do... | 0/10 |
|   | 320 | >60/6.9 | 6/10 Cures | 0/10 |
|   | 160 | 22.5/6.9 | +15.6 | 0/10 |
|   | 80 | 18.1/6.9 | +11.2 | 0/10 |
|   | 40 | 15.9/6.9 | +9.0 | 0/10 |
|   | 20 | 14.8/6.9 | +7.9 | 0/10 |

Example 2.—2,4,7-triamino-6-(o-chloro)pteridine

The manner of preparing this compound used in the process of our invention will now be described:

To a solution of 0.5 g. of sodium in 400 ml. of dried 2-ethoxyethanol add 6.16 g. of 2,4,6-triamino-5-nitrosopyrimidine, followed by 6.64 of o-chlorophenylacetonitrile. Stir the mixture and boil under reflux for 3 hours, filter and evaporate to dryness on a rotary evaporator. Treat the residue with water and recrystallize the solid material from aqueous dimethylformamide to obtain 2,4, 7-triamino-6-(o-chlorophenyl)-pteridine, M.P. 349° effv.
Analysis.—Calcd.: C=50.09, H=3.50, N=34.08, Cl=12.32. Found: C=50.36, H=3.49, N=33.93, Cl=12.2.

ANTIMALARIAL DRUG EVALUATION RESULTS
[Chemical name—2,4,7-triamino-6-(o-chlorophenyl)-pteridine]

| | Dose, mg./kg. | Mean Survival Time (days) T/C | Change in MST (days) | Toxic Deaths Drug |
|---|---|---|---|---|
| Test No.: | | | | |
| I | 1,250 | >60/7.9 | 3/5 Cures | 0/5 |
| | 250 | 20.8/7.9 | +12.9 | 0/5 |
| | 50 | 10.0/7.9 | +2.1 | 0/5 |
| II | 1,200 | >60/8.0 | 5/5 Cures | 0/5 |
| | 900 | >60/8.0 | do | 0/5 |
| | 600 | >60/8.0 | do | 0/5 |
| | 450 | >60/8.0 | 3/5 Cures | 0/5 |
| | 300 | >60/8.0 | 2/5 Cures | 0/5 |
| III | 1,280 | >60/7.6 | 5/5 Cures | 0/5 |
| | 640 | <60/7.6 | do | 0/5 |
| | 320 | >60/7.6 | 2/5 Cures | 0/5 |
| | 160 | 17.8/7.6 | +10.2 | 0/5 |
| | 80 | 15.6/7.6 | +8.0 | 0/5 |
| | 40 | 13.0/7.6 | +5.4 | 0/5 |
| | 20 | 8.8/7.6 | +1.2 | 0/5 |
| | 10 | 8.6/7.6 | +1.0 | 0/5 |

The effective dosage of the compounds as used in the process of the invention depends upon the severity, the stage, and the individual characteristics of each case and will be determined by an attending physician. Generally, a dosage of from 0.10 to about 15 mg. per kg. of body weight per day constitutes the range to be used in the process of the invention, with a range of about 0.25 to 5 mg. per kg. per day for the preferred compounds.

Representative formulations embodying the composition of Example 1 for use in the process of the invention follow:

Tablet formulation.—The following formulation provides for the manufacture of 1,000 tablets:

| | Grams |
|---|---|
| (1) 2,4,7-triamino-6-(o-tolyl)pteridine | 25 |
| (2) Lactose U.S.P. | 181 |
| (3) Corn starch U.S.P. | 92.5 |
| (4) Magnesium stearate | 1.5 |

Thoroughly granulate a mixture of 72.5 g. of corn starch and the lactose with a paste prepared by dissolving 20 gm. of corn starch in 100 ml. of hot distilled water. Dry the resulting granulation at 40–45° C. and pass it through a No. 16 mesh screen. To the dried, screened granulation add a blend mixture of the active ingredient (1) and the magnesium stearate. Thoroughly blend and then press into tablets of 300 mg. each.

Capsule formulation.—The following formulation provides for the manufacture of 1,000 capsules:

| | Grams |
|---|---|
| (1) 2,4,7-triamino-6-(o-tolyl)pteridine | 25 |
| (2) Lactose | 273.5 |
| (3) Magnesium stearate | 1.5 |

Mix active ingredient (1) with the lactose and blend in the magnesium stearate. Fill hard gelatin capsules with 300 mg. each of the blended mixture to produce capsules containing 25 mg. of 2,4,7-triamino-6-(o-tolyl) pteridine.

Parenteral formulations.—The following formulation provides for the manufacture of 1,000 vials each containing 10 mg. of active ingredient:

(1) 2,4,7-triamino-6-(o-tolyl)pteridine ____ 10 gm.
(2) Hydrochloric acid U.S.P. _____ q.s. to solubilize.
(3) Water for injection U.S.P. _____ q.s. 1 liter Mix ingredients (1) and (2) and add sufficient water to make a 1,000 ml. of volume. Sterile-filter the solution and asceptically fill one milliliter of the so-prepared solution into sterile ampules.

Other 2,4,7 - triamino - 6 - (o - substituted - phenyl) pteridines useful in the process of our invention are 2,4,7-triamino - 6 - (1 - naphthyl)pteridine; 2,4,7 - triamino-6 - (o - bromophenyl)pteridine; 2,4,7 - triamino - 6 - (o-ethylphenyl)pteridine; 2,4,7 - (4 - chloro - o - tolyl) pteridine; 2,4,7 - triamino - 6 - (o - methoxyphenyl) pteridine; 2,4,7 - triamino - 6 - (2 - diphenyl)pteridine, and 2,4,7-triamino - 6 - (2,6 dichlorophenyl)pteridine, all of which have demonstrated antimalarial activity and are, therefore, equivalents of the compounds used in the process sought to be patented.

Example 3.—2,4,7,triamino-6-(2-diphenyl)pteridine

To a solution of 0.66 g. of sodium in 500 ml. of dried 2-ethoxyethanol add 4.43 g. of 2,4,6-triamino-5-nitrosopyrimidine followed by 6.16 g. of 2-diphenylacetonitrile. Stir the mixture mechanically and boil under reflux for 6 hours. Filter; evaporate the solution to dryness on a rotary evaporator. Treat the residue with water. Separate the brown precipitate by filtration and recrystallize from aqueous dimethylformamide to obtain 2,4,7-triamino-6-(2-diphenyl)pteridine, M.P. 362°.

Analysis. — Calcd.: C=65.64, H=4.59, N=29.77. Found: C=65.19, H=4.70, N=29.61.

Example 4.—2,4,7-triamino-6-(o-ethylphenyl)pteridine

To a solution of 1.0 g. of sodium in 400 ml. of dry 2-ethoxyethanol add 6.16 g. of 2,4,6-triamino-5-nitrosopyrimidine and 6.4 g. of 2-ethylphenylacetonitrile. Stir the mixture and boil under reflux for 2 hours. Filter, remove the solvent on a rotary evaporator and treat the residue with water to precipitate a solid. Purify this solid by dissolving in acetic acid, follow by reprecipitation with ammonia solution. Recrystallize frim aqueous dimethylformamide to obtain 2,4,7-triamino-6-(o-ethylphenyl) pteridine, M.P. 316° decomp.

Analysis.—Calcd.: C=59.77, H=5.37, N=34.86. Found: C=59.64, H=5.30, N=34.48.

Example 5.—2,4,7-triamino-6-(o-bromophenyl)pteridine

To a solution of 1.0 g. of sodium in 450 ml. of dried 2-ethoxyethanol add 6.16 g. of 2,4,6-triamino-5-nitrosopyrimidine and 8.63 g. of o-bromophenylacetonitrile. Stir the mixture and boil under reflux for 3 hours. Filter the hot solution and evaporate to dryness on a rotary evaporator. Triturate the residue with water and separate the brown solid by filtration. Recrystallization from aqueous 2-ethoxyethanol affords 2,4,7-triamino-6-(o-bromophenyl)pteridine, M.P. 320° decomp.

Analysis. — Calcd.: C=43.39, H=3.03, N=29.52, Br=24.06. Found: C=43.24, H=3.00, N=29.23, Br=24.04.

Example 6.—2,4,7-triamino-6-(4-chloro-o-tolyl)pteridine

To a solution of 0.23 g. of sodium in 200 ml. of dry 2-ethoxyethanol add 1.54 g. of 2,4,6-triamino-5-nitrosopyrimidine and 1.82 g. of 4-chloro-2-methylphenylacetonitrile. Stir the mixture and boil under reflux for 1 hour 40 minutes. Remove the solvent on a rotary evaporator and triturate the residue with water to precipitate a solid. Recrystallize from aqueous dimethylformamide to obtain 2,4,7-triamino-6-(4chloro-o-tolyl)pteridine, M.P. 330°.

Analysis. — Calcd.: C=51.74, H=4.01, N=32.49, Cl=11.75. Found: C=51.41, H=3.94, N=32.27, Cl=11.9, 11.7.

Example 7.—2,4,7-triamino-6-(2,6-dichlorophenyl) pteridine

To a solution of 0.92 g. of sodium in 500 ml. of dry 2-ethoxyethanol add 6.16 g. of 2,4,6-triamino-5-nitrosopyrimidine and 8.18 g. of 2,6-dichlorophenylacetonitrile. Boil the mixture under reflux with stirring for 2 hours. Filter, evaporate the solution to dryness on a rotary evaporator, and triturate the residue with water. Recrystallize the brown precipitate obtained from aqueous dimethylformamide to obtain 2,4,7-triamino-6-(2,6-dichlorophenyl)pteridine, M.P. 353° effv.

*Analysis.* — Calcd.: C=44.73, H=2.82, N=30.44, Cl=20.01. Found: C=44.85, H=2.83, N=30.10. Cl=21.9.

The subject matter which the applicants regard as their invention is particularly pointed out and distinctly claimed as follows:

1. The process for the application of antimalarial therapy to human beings which comprises administering to a human being suffering from malaria, 2,4,7-triamnio-6-(o-tolyl)pteridine at a dosage range from 0.25 mg. to 5 mg. per kg. of body weight per day.

2. The process for the application of antimalarial therapy to human beings which comprises administering to a human being suffering from malaria, 2,4,7-triamino-6-(o-chlorophenyl)pteridine at a dosage range from 0.25 mg. to 5 mg. per kg. of body weight per day.

References Cited

UNITED STATES PATENTS 3,081,230  3/1963  Weinstock _____ 167—65

ALBERT T. MEYERS, *Primary Examiner.*

J. D. GOLDBERG, *Assistant Examiner.*